UNITED STATES PATENT OFFICE 2,370,093

INTERMEDIATES FOR THE SYNTHESIS OF RIBOFLAVIN AND PROCESS FOR PRODUCING SUCH INTERMEDIATES

Max Tishler, Rahway, N. J., and John W. Wellman, Cleveland Heights, Ohio, assignors to Merck & Co. Inc., Rahway, N. J., a corporation of New Jersey No Drawing. Application September 5, 1942, Serial No. 457,466. In Canada January 13, 1941

15 Claims. (Cl. 260—205)

This invention relates generally to the manufacture of vitamin substances and in a more particular sense to intermediates useful in the synthesis of riboflavin, together with processes for manufacturing the same.

The present invention is concerned with the synthesis of 1-ribitylamino-2-arylazo-4,5-dimethyl benzene and 1-ribitylamino-2-para-substituted-arylazo-4,5-dimethyl benzene compounds which are useful as intermediates in the synthesis of riboflavin. The invention is particularly concerned with the 2-phenylazo compound which can be condensed with barbituric acid to form riboflavin.

In accordance with the present invention, an aryl-diazonium-halide or a para-substituted-aryldiazonium-halide is reacted with 1-ribityl-amino-4,5-dimethyl benzene to produce a 1-ribitylamino-2-arylazo-4,5-dimethyl benzene or a 1-ribitylamino-2-para-substituted-arylazo-4,5-dimethyl benzene.

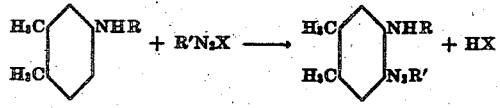

X is halogen, R' is an aryl group, and R is ribityl or tetraacetylribityl.

The following examples illustrate methods of carrying out the present invention, but it is to be understood that these examples are provided by way of illustration, and not by way of limitation.

*Example 1*

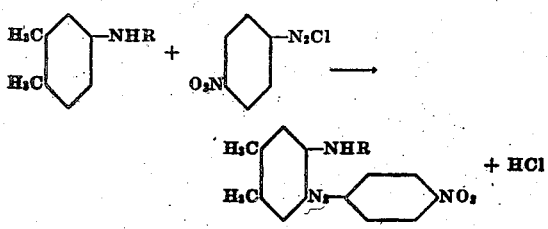

R is ribityl or tetraacetylribityl.

About 3.34 gms. of p-nitroaniline hydrochloride are dissolved by warming in a solution of approximately 3 cc. of concentrated hydrochloric acid in about 3 cc. of water. The hot solution is added to about 60 cc. of water with stirring, and the mixture is then cooled to approximately 10° C. At this temperature, with stirring, about 165 gms. of sodium nitrite in 20 cc. of water are added rather rapidly, and the mixture is allowed to stand for 1½ hours. During this time, nearly all of the nitroaniline hydrochloride reacts and passes into solution. The excess of nitrous acid is then destroyed by adding urea, the mixture is filtered from small amounts of insoluble material, and the filtrate is then added rapidly to a stirred solution of about 5 gms. of 1-(tetraacetyl-d-ribitylamino)-4,5-dimethyl-benzene in 125 cc. of acetic acid. After the addition, the mixture is kept at about 0-5° C. for approximately four hours, and then at room temperature for about ten hours. At the beginning, a red, gummy, material separates and gradually hardens. The 1-(tetraacetyl-d-ribitylamino)-2-p-nitrophenylazo-4,5-dimethyl benzene, which is of a deep red color, is filtered, washed well with water, and dried. It is crystallized by dissolving in a small amount of hot chloroform and diluting with hot methanol. Yield about 6.3 gms., having a melting point of 168-9° C.

*Example 2*

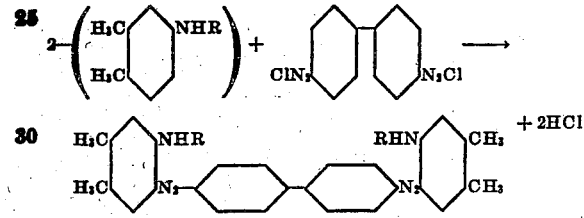

R is ribityl or tetraacetylribityl.

About 1.31 gm. of benzidine are dissolved in 25 cc. of water containing approximately 4.2 cc. concentrated hydrochloric acid. The mixture is cooled to about 0° C., and approximately 0.99 gm. of sodium nitrite in about 10 cc. water are added. The mixture is cooled to 0-5° C., and about 4 gm. of 1-N-tetraacetylribitylamino-4,5-dimethyl-benzene in 8 cc. of glacial acetic acid are added. The deep purple mixture is stirred for about 2 hours, and then a 5% solution of sodium acetate is added dropwise until the mixture is faintly gray to Congo red paper. A gummy material separates which soon hardens. The mixture is stirred at 0-5° C. for four hours longer, and then at room temperature for 12 hours. The solid 4,4'-di-(1-tetraacetyl-d-ribitylamino-4,5-dimethyl-2-phenylazo) diphenyl is filtered, and washed with water. Weight, 4.8 gms., melting point 82-85° C.

Example 3

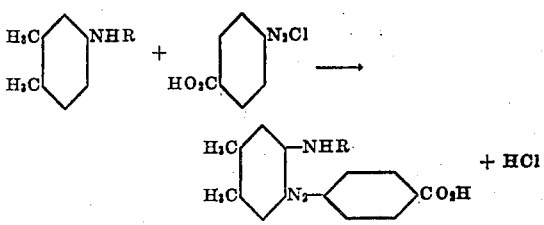

R is ribityl or tetraacetylribityl.

About 1.22 gm. of p-aminobenzoic acid, 25 cc. of water and about 2 cc. of concentrated hydrochloric acid are heated to form a solution. The mixture is then cooled to 0–2° C., and a solution of about 0.62 gm. of sodium nitrite in 15 cc. of water is added slowly. After all the nitrous acid is used, the mixture is added with stirring to a solution of about 3 gm. of 1-N-tetraacetylribityl-amino-4,5-dimethyl-benzene in 75 cc. acetic acid at approximately 0–5° C. The mixture, which turns dark purple, is stirred for about two hours, and then a solution of 15 gms. of sodium acetate in 45 cc. of water is added dropwise, whereupon the mixture becomes bright red, and a gummy material separates and gradually solidifies. The 1-N-(tetraacetyl-d-ribitylamino)-2-p-carboxyphenylazo-4,5-dimethyl benzene is filtered, washed with water, and dried. This material melts at 178–180° C.

Example 4

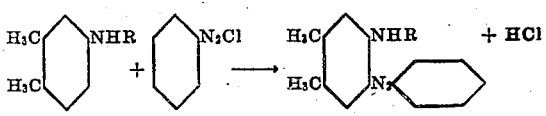

R is ribityl or tetraacetylribityl.

About 10 cc. of an aqueous solution of benzene diazonium chloride, prepared by diazotizing about 0.36 g. of aniline in the conventional manner, is added at 10–15° C. to a cold solution of about 1 g. of 1-tetraacetylribitylamino-4,5-dimethyl benzene in approximately 25 cc. of glacial acetic acid. The mixture is stirred for about an hour at 10–15° C. during which time the solution becomes dark red and 1-tetraacetylribitylamino-2-phenylazo-4,5-dimethyl benzene separates as a gummy mass, suitable for use as an intermediate in the synthesis of riboflavin without further purification.

Example 5

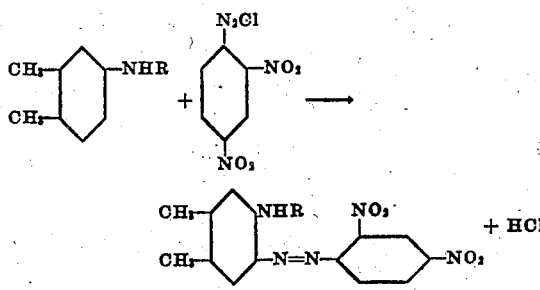

R is tetraacetylribityl.

About 2.8 gm. sodium nitrite are added with continuous stirring to 60 cc. conc. sulfuric acid causing the temperature of the mixture to rise to about 40–45° C. The resulting clear, pale yellow solution is cooled to about 30° C. and approximately 7.2 gm. of 2,4-dinitroaniline are added slowly. The solution is cooled to about 20° C., stirred for 2 hours, and then poured upon ice. The resulting clear, pale yellow solution is then rapidly added to a chilled solution of about 16.6 gms. of tetraacetylribityl xylidine dissolved in about 225 cc. of glacial acetic acid. The resulting deep purple-black reaction mixture is stirred at about 0–5° C. for approximately 4 hours and then at room temperature overnight. A black-brown solid separates and is filtered and washed with water.

The solid, after recrystallized from acetone, yields deep purple crystals melting at 175–8° C.

The 1-tetraacetylribitylamino-4,5-dimethyl benzene mentioned in the foregoing examples can be prepared by reacting xylidine with tetraacetylribonic acid nitrile in the presence of hydrogen and a hydrogenation catalyst such as palladium, platinum, and nickel.

It will be understood that if desired the tetraacetylribityl compounds above mentioned can be replaced with the corresponding ribityl compounds in equivalent proportions. Other para-substituted anilines can be used in the preparation of the diazonium compound instead of those above mentioned.

Other diazonium halides such as bromides or iodides can be used instead of chlorides in the process above described.

This case is a continuation-in-part of applications Serial No. 398,584, filed June 18, 1941, and Serial No. 417,136 filed October 30, 1941, by the same inventors, entitled respectively Chemical compounds and processes of preparing the same and Alloxazines and isoalloxazines and processes for their production.

Modifications may be made in carrying out the present invention, without departing from the spirit and scope thereof, and the invention is to be limited only by the appended claims.

What is claimed is:

1. 1-tetraacylribitylamino-2-arylazo-4,5-dimethyl benzene.
2. 1-tetraacetylribitylamino-2-arylazo-4,5-dimethyl benzene.
3. 1-tetraacylribitylamino-2-phenylazo-4,5-dimethyl benzene.
4. 1-tetraacetyl-d-ribitylamino-2-phenylazo-4,5-dimethyl benzene.
5. 1-tetraacylribitylamino-2-p-nitrophenylazo-4,5-dimethyl benzene.
6. 1-(tetraacetyl-d-ribitylamino)-2-p-nitrophenylazo-4,5-dimethyl benzene.
7. 1-N-(tetraacylribitylamino)-2-p-carboxyphenylazo-4,5-dimethyl benzene.
8. 1-N-(tetraacetyl-d-ribitylamino)-2-p-carboxyphenylazo-4,5-dimethyl benzene.
9. The process that comprises condensing an aryldiazonium-halide with a tetraacyl ribitylamino xylene.
10. The process that comprises condensing an aryldiazonium-halide with 1-tetraacylribitylamino-4:5-dimethyl benzene.
11. The process that comprises condensing an aryldiazonium-halide with 1-tetraacetylribitylamino-4,5-dimethyl benzene.
12. The process that comprises condensing a p-nitrophenyldiazonium-halide with a tetraacyl ribitylamino xylene.
13. The process that comprises condensing a p-nitrophenyldiazonium-halide with a tetraacetylribitylamino xylene.
14. The process that comprises condensing a p-carboxylic-acid-phenyl-diazonium-halide with a tetraacyl ribitylamino xylene.
15. The process that comprises condensing a p-carboxylic-acid-phenyl-diazonium-halide with a tetraacetylribitylamino xylene.

MAX TISHLER.
JOHN W. WELLMAN.